June 3, 1924.
R. C. PUTNAM
COOKING UTENSIL
Filed March 12, 1924
1,496,430
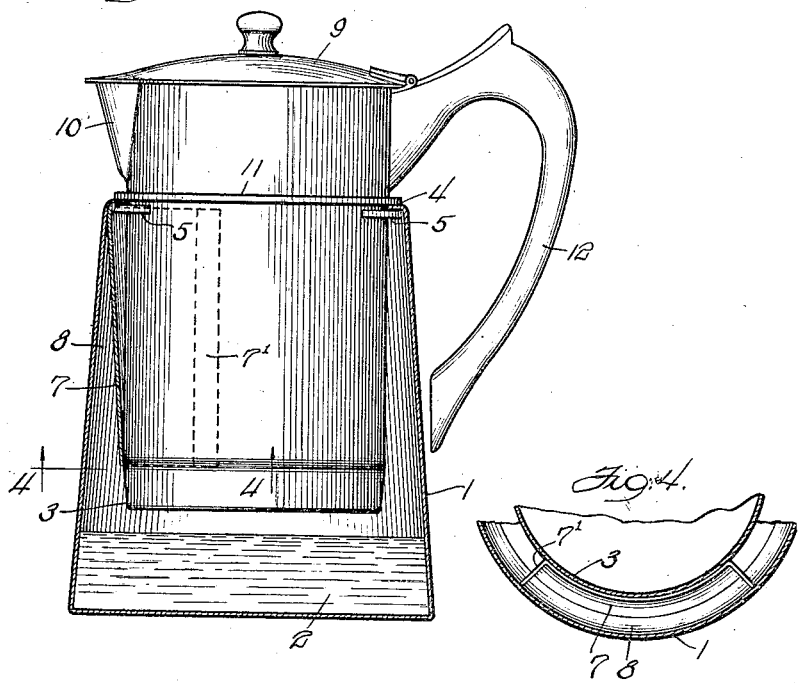
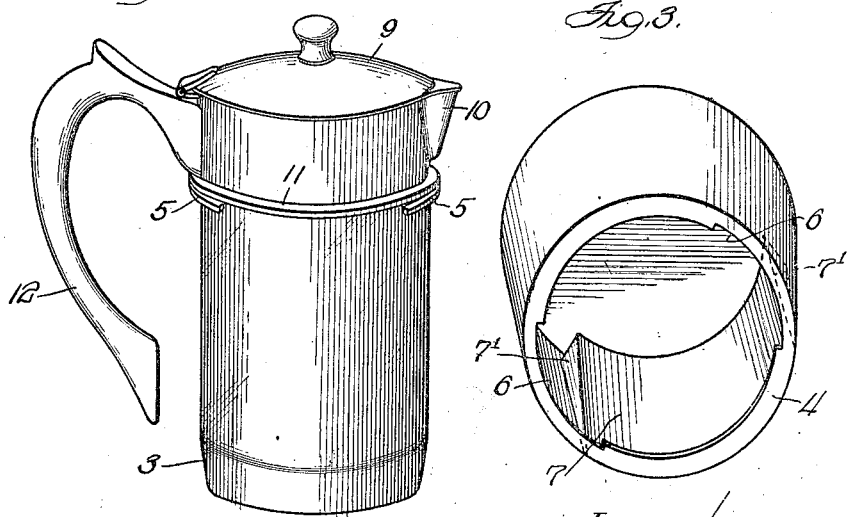

Patented June 3, 1924.

1,496,430

UNITED STATES PATENT OFFICE.

RALPH C. PUTNAM, OF AURORA, ILLINOIS.

COOKING UTENSIL.

Application filed March 12, 1924. Serial No. 698,669.

*To all whom it may concern:*

Be it known that I, RALPH C. PUTNAM, a citizen of the United States of America, and a resident of Aurora, in the county of Kane and State of Illinois, have invented a new and useful Improvement in Cooking Utensils, of which the following is a specification.

The main objects of this invention are to provide an improved form of cooking utensil of the double type wherein one receptacle containing the liquid to be cooked is inserted within another receptacle containing water so as to avoid a direct contact of the flame or other primary heating medium with the inner receptacle; to provide improved fastening means for locking together the two separable parts of a double cooker to permit them to be readily handled as a unit; to provide an improved construction and arrangement of a handle on the inner receptacle so shaped and arranged as to provide substantial balancing of the weight of the receptacles in their pouring position with respect to the operator's hand both when the inner receptacle is handled alone and when attached to the outer receptacle; to provide an improved form of trap in the outer receptacle adapted to prevent the water from running out of said outer receptacle in the event that the inner receptacle is not withdrawn from the outer one while its contents are being poured; and to provide a double cooker of this kind which is especially adapted for use in cooking coffee.

An illustrative embodiment of this invention is shown in the accompanying drawings, in which—

Figure 1 shows the two receptacles assembled as a unit, the outer receptacle being in section and the inner receptacle being in elevation.

Fig. 2 is a perspective view of the inner receptacle.

Fig. 3 is a perspective view of the outer receptacle.

Fig. 4 is a fragmentary section taken on the line 4—4 of Figure 1.

The double cooking utensils heretofore in use, such as the well-known farina kettle, have not been adapted for handling as a unit in pouring out the contents. To pour the contents of such utensils, it has been necessary to first remove the inner receptacle from the outer one. Moreover, in this prior type of double cooker no means has been provided for locking the two receptcles together, and, therefore, a separate handle has been provided for each of the receptacles.

In the specific construction herein shown, the cooking utensil to which the present invention is applied involves an improved construction and arrangement of telescoping receptacles which, when locked together as a unit, may be readily handled like an ordinary pitcher. In the embodiment herein shown, the general contour of the receptacles is such that, when they are assembled as a unit, the utensil has the appearance of a pitcher.

As herein illustrated, the improved utensil comprises an outer frusto-conical receptacle 1 adapted to contain water, as shown at 2, and being open at its upper end to receive the pitcher-shaped receptacle 3 which is adapted to extend down into the receptacle 1 so as to be heated by the water and steam in the outer receptacle.

Extending around the upper rim of the receptacle 1, is an inwardly projecting annular flange 4 which forms a seat for supporting the receptacle 3. The flange 4 also coacts with diametrically opposed projections 5 formed on the outside of the receptacle 3 for locking the two receptacles together. Formed in the inner edge of the flange 4, is a pair of diametrically opposed notches 6 arranged to permit the projections 5 to be inserted therethrough in the insertion and removal of the receptacle 3. Arranged at one side of the receptacle 1, is an apron 7 having triangular side walls 7.1 which are secured along the edges thereof to the wall of the receptacle 1. The upper edge of the apron 7 is also secured to the receptacle 1 adjacent the flange 4 so that the apron forms a water-tight pocket 8 for trapping liquid in the outer receptacle when the entire utensil is held in position for pouring out the contents of the inner receptacle. When the two receptacles are locked together, the pocket 8 is located at the side opposite the handle as shown in Figure 1.

The receptacle 3 is provided with the usual lid 9 and spout 10. Extending around the shell of the receptacle 3 directly below the spout 10, is an annular bead 11 adapted to rest on the flange 4 of the outer receptacle for supporting the inner receptacle while permitting the relative turning of said receptacles which is necessary in locking and unlocking the parts. When the two receptacles are assembled as a unit as shown in Figure 1, the inner receptacle is spaced above the bottom of the outer receptacle so as to provide a water chamber below the inner receptacle. The projections 5 are spaced below the bead 11 so as to coact with the lower face of the flange 4 when the bead 11 rests upon the upper face thereof.

Mounted on the upper part of the receptacle 3, in diametrically opposed relation to the spout 10, is an improved construction and arrangement of a handle 12 which extends downwardly outside of the outer receptacle 1 without being attached to the latter. The handle 12 is substantially C-shaped having its upper end secured to the receptacle 3 and having its lower end spaced therefrom so as to overlap the outer receptacle, which gives the general appearance of an ordinary pitcher handle. The handle 12 is so shaped and arranged as to provide substantial balancing of the weight of the utensil in its pouring position with respect to the operator's hand, both when the inner receptacle is handled alone and when both receptacles are assembled as a unit. To unlock the two receptacles the inner receptacle is turned relative to the outer one so as to disengage the projections 5 from the flange 4.

Although but one specific embodiment of this invention has been herein shown and described, it is to be understood that numerous details of the construction shown may be altered or omitted without departing from the spirit of this invention as defined by the following claims.

I claim:

1. A cooking utensil comprising a pair of telescoping receptacles each adapted to hold a liquid, means for locking said receptacles together, and a handle on the inner of said receptacles whereby said inner receptacle may be withdrawn from the outer one and whereby both of said receptacles when locked together may be handled as a unit, said handle extending downwardly outside of the outer receptacle.

2. A pitcher-shaped cooking utensil comprising a pair of telescoping receptacles each adapted to hold a liquid, the inner of said receptacles projecting above the outer receptacle, means for locking said receptacles together, and a handle on the upper part of said inner receptacle, said handle extending downwardly outside of said outer receptacle.

3. A pitcher-shaped cooking utensil comprising a pair of telescoping receptacles each adapted to hold a liquid, the inner of said receptacles being pitcher-shaped and projecting above the outer receptacle, means for locking said receptacles together, and a handle arranged on one side of the upper part of said inner receptacle, said handle extending downwardly so as to overlap said outer receptacle.

4. A pitcher-shaped cooking utensil comprising a frusto-conical outer receptacle open at its top and adapted to contain a liquid, a pitcher-shaped inner receptacle seated in the open end of said outer receptacle and projecting above said outer receptacle, coacting means on said receptacles for locking them together, and a handle arranged on one side of the upper part of said inner receptacle, said handle extending downwardly so as to overlap said outer receptacle.

5. A pitcher-shaped cooking utensil comprising a frusto-conical outer receptacle open at its top and adapted to contain a liquid, an inwardly extending annular flange located at the upper edge of said receptacle and having a pair of diametrically opposed notches formed therein, a pitcher-shaped inner receptacle seated in the open end of said outer receptacle and projecting above said outer receptacle, an annular shoulder extending around said inner receptacle and resting on said flange for supporting said inner receptacle, a pair of diametrically opposed projections on said inner receptacle spaced below said annular shoulder, said projections being adapted for insertion through said notches and to be shifted into locking engagement with said flange by a relative turning of said receptacle, and a handle arranged on one side of the upper part of said inner receptacle, said handle extending downwardly so as to overlap said outer receptacle.

6. A cooking utensil comprising a pair of telescoping receptacles each adapted to hold a liquid, the inner receptacle projecting above the outer receptacle, and a downwardly extending apron arranged on the inside of the outer receptacle and coacting with the wall of said outer receptacle to form a pocket adapted to trap liquid in said outer receptacle when the utensil is held in position for pouring.

7. A pitcher-shaped cooking utensil comprising a frusto-conical outer receptacle open at its top and adapted to contain a liquid, a pitcher-shaped inner receptacle seated in the open end of said outer receptacle and projecting above said outer receptacle, coacting means on said receptacles for locking them together, a spout on one side of the upper part of said inner receptacle, a handle on the opposite side of said upper part, and an apron arranged on the inside of said outer receptacle and extending downwardly from the upper edge thereof, said apron being located below said spout and coacting with the wall of said outer receptacle to form a pocket adapted to trap liquid in said outer receptacle when the utensil is held in position for pouring.

8. A cooking utensil comprising a pair of telescoping receptacles each adapted to hold a liquid; means for locking said receptacles together, and a handle on the inner of said receptacles, said handle extending downwardly outside of and overlapping said outer receptacle and being arranged so as to provide substantial balancing of the weight of the utensil in its pouring position with respect to the operator's hand.

9. A cooking utensil comprising a pair of telescoping receptacles each adapted to hold liquid, the outer receptacle being open at its top, an inwardly extending annular flange located at the upper edge of said outer receptacle and having notches formed therein, the inner receptacle being seated in the open end of said outer receptacle and projecting above said outer receptacle, an annular shoulder extending around said inner receptacle and resting on said flange for supporting said inner receptacle, projections on said inner receptacle below said annular shoulder, adapted for insertion through said notches and to be shifted into locking engagement with said flange by a relative turning of said receptacles, and a handle arranged on one side of the upper part of said inner receptacle, said handle extending downwardly so as to overlap said outer receptacle.

Signed at Chicago this 8th day of March 1924.

RALPH C. PUTNAM.